Feb. 5, 1963 V. G. MEADORS ETAL 3,076,504
SECONDARY OIL RECOVERY PROCESS
Filed June 19, 1958
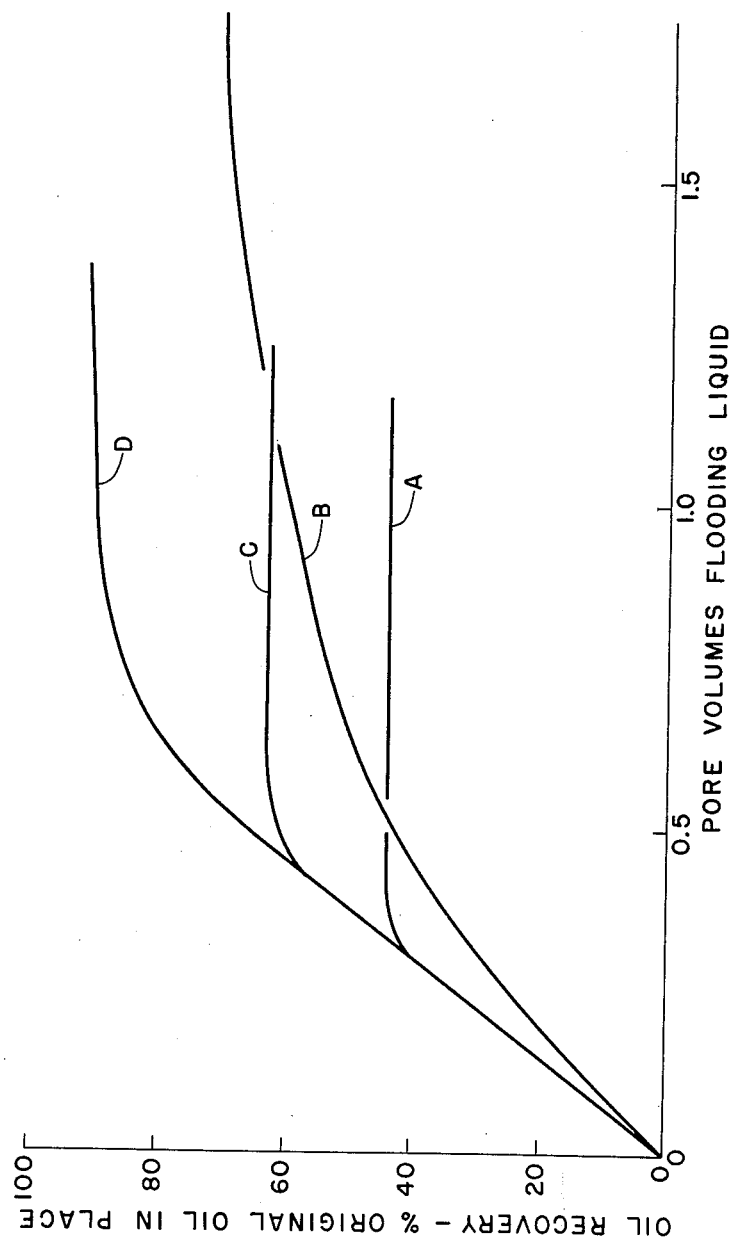
Victor Gerald Meadors
Charles Daniel Russell   Inventors
By *James A. Reilly*  Attorney

3,076,504
SECONDARY OIL RECOVERY PROCESS

Victor G. Meadors and Charles D. Russell, Tulsa, Okla., assignors to Jersey Production Research Company, a corporation of Delaware
Filed June 19, 1958, Ser. No. 743,038
8 Claims. (Cl. 166—9)

This invention relates to the recovery of relatively viscous petroleum from underground reservoirs. The invention especially concerns a method of secondary recovery wherein a mutually oil- and water-miscible liquid possessing prescribed viscosity characteristics is injected into a reservoir for the purpose of displacing oil from the reservoir.

A subterranean oil reservoir in the initial phase of its producing life generally produces oil as a result of innate gas pressure, rock pressure, or water pressure. Thus, when a well first penetrates the reservoir, the innate pressure drives oil from the reservoir through the well to the earth's surface. This phase of the producing history of a reservoir is generally referred to as its primary production phase or period. Some reservoirs, of course, never have a primary production period in the sense described above. Such reservoirs, however, may also be treated in accordance with the present invention.

It has been found from experience that a petroleum reservoir at the end of its primary production period still contains very appreciable quantities of crude oil. Substantially all reservoirs at this point, for example, generally contain at least about 25 percent of their original oil. Reservoirs containing viscous crude oils—i.e., oils of about 50-centipoise or greater viscosity—are particularly difficult to produce; and they may contain as much as 90 percent or more of their original oil at the end of primary production.

In order to recover additional oil from reservoirs that have completed their primary production phase, the petroleum industry has resorted to a variety of secondary recovery processes. Such processes in general rely upon the use of a driving fluid which is injected within a reservoir so as to displace oil from the reservoir. Materials that have been used or suggested for use as driving fluids include natural gas, water, petroleum fractions, steam, and the like.

Secondary recovery processes, in the main, have been successful in increasing the quantities of oil that can be produced from underground reservoirs. However, many reservoirs still contain appreciable amounts of oil even though secondary recovery processes have been applied to them. This condition, once again, is especially true for those reservoirs that contain viscous crude oils of about 50-centipoise viscosity or greater. Accordingly, even though secondary recovery processes already known to the art have been effective in increasing the world's oil reserves, a great and continuing effort is still being made to discover new and improved methods for this purpose.

One of the more promising recent secondary recovery techniques employs an oil solvent as a driving medium. The solvent, as it is injected within a reservoir, effectively extracts the oil from the reservoir. The solvent also drives oil before it as it progresses through a reservoir; and oil and solvent—alone or in admixture with one another—are produced from the reservoir.

Very promising performance with solvent-type secondary recovery processes has been realized in reservoirs containing low-viscosity crudes. Performance in reservoirs containing viscous crude oils, however, has not met with equal success. Instead, it has been found in such reservoirs that the solvents have a pronounced tendency to "finger" or channel their way through the reservoirs and thereby by-pass great quantities of oil. Once these "fingers" or channels reach the production wells, the solvent continues to flow preferentially through these fingers or channels, with the result that practical oil recoveries in viscous crude oil reservoirs are difficult to realize.

It is accordingly a primary object of this invention to provide an improved secondary recovery process which is especially suitable for use in reservoirs that contain viscous crude oils. It is a further object of the invention to provide a secondary recovery process for viscous crude oil reservoirs which is more practical and economical than methods heretofore suggested.

These and related objects, which will be expressly discussed or readily apparent in the following description, may be realized in accordance with this invention by injecting an oil- and water-miscible liquid possessing prescribed viscosity characteristics into a reservoir. More specifically, the viscosity of the liquid injected should be such that it possesses a mobility of not more than about twice the mobility of the crude oil in place within the reservoir. Preferably, the injected liquid should have a mobility no greater than that of the oil in place. It is further preferred that the liquid be injected as a bank, the size of the bank (i.e., the volume of the liquid) being sufficient to preserve its bank form from the injection wells to the producing wells. In general, the amount of liquid should be at least about 0.1 of the pore volume of the portion of the reservoir through which it travels.

When a liquid of this invention is injected as a bank, it is additionally preferred that water be injected as a driving medium behind the liquid. The transition from the liquid to any following water drive may be abrupt, if so desired. It is preferred, however, that any such transition be a gradual one. In other words, the trailing portion of bank of liquid should be progressively diluted with water.

To aid in understanding the present invention, the following equation is submitted to explain the term "mobility," as that term is used in this description:

$$\frac{M_0}{M_1} = \frac{\mu_1}{\mu_0} \cdot \frac{K_0}{K_1} \qquad (1)$$

where $M_0$ is the mobility of the reservoir oil through a given reservoir.
$M_1$ is the mobility of the driving liquid through the reservoir.
$\mu_0$ is the viscosity of the reservoir oil under reservoir conditions.
$\mu_1$ is the viscosity of the driving liquid under reservoir conditions.
$K_1$ is the relative permeability of the reservoir toward the driving liquid.
$K_0$ is the relative permeability of the reservoir toward the reservoir oil.

From the above equation, it will be apparent that the mobility of any liquid within a reservoir depends inversely upon its viscosity and directly upon the permeability of the reservoir to that liquid. When two fluids have equal mobilities within a reservoir, it is understood that they flow through the reservoir with equal ease. When a liquid possesses a high mobility relative to the crude oil within a reservoir, the liquid has a pronounced tendency to "finger" or channel as described hereinabove. The fingering or channeling quality of the solvents used or proposed to date as driving media in secondary recovery processes may be explained on this basis. The poor performance of such materials in viscous crude oil reservoirs stems to a great extent from this fact.

As explained briefly and earlier in this description, the present invention calls for the use of a mutually oil- and water-miscible liquid as a driving fluid within a viscous crude oil reservoir. The driving liquid should also possess a viscosity sufficient to provide it with a mobility of no more than about twice that of the mobility of the oil in place. In more specific terms, it has been found that the driving liquid in viscous oil reservoirs must possess a viscosity of at least about 10 centipoises.

The driving liquids of this invention will ordinarily contain two components—one of a character to render the liquid mutually water- and oil-miscible, and the other to provide the liquid with the necessary viscosity value.

Referring first to the solvent component, it is necessary that this component be selected from liquid materials which are both oil- and water-soluble. Examples of such materials include various amines, including diamines, triamines and higher polyamines. The hydrocarbon portions of the amines may contain various substituent groups, and they may also vary greatly in their general chemical structure. For example, they may be paraffinic, aromatic, olefinic, or naphthenic in character. Furthermore, the amines may be primary, secondary, or tertiary in character. Specific examples of suitable amines include tertiary octyl amine, menthane diamine, t-butylamine, triethylene tetramine, n-butyl-ethanol amine, N,N-diethoxy aniline, 2-ethyl-amino-ethanol, 2-diethyl-amino-ethanol, and ethanol amine.

It will be apparent that the above amines as well as other materials suitable for use as solvent components in this invention need not be completely miscible with either water or mineral oil. The degree of solubility, however, should be at least about 50 percent by volume. In other words, a material to be suitable for use as a solvent in this invention should be soluble within both water and oil to the extent of at least about 50 volume percent.

Other materials suitable for use as the solvent components of this invention include alcohols and glycols such as cyclohexanol, tertiary-amyl alcohol, furfuryl alcohol, 2-methyl-2,4-pentanediol, dipropylene glycol, 2-butoxy-ethanol, diethylene-glycol monobutyl ether, triethylene glycol monophenyl ether, and 1,5-pentanediol.

Still other materials that are suitable for use as solvents in the practice of the invention include ketones, aldehydes, and the like. Specific examples of such compounds include 1,3-dioxane, 1,4-dioxane, methyl ethyl ketone, acetaldehyde, and furfuraldehyde.

It will be recognized that in a general sense the solvent components of this invention must possess sufficient hydrocarbon-type structure to render them soluble in mineral oil; and they must also possess sufficient substituted groups such as amino groups, hydroxyl groups, carboxyl groups, amido groups, keto groups, aldehyde groups, or the like to render them soluble with water. With this general criterion in mind, and with the specific examples and classes of compounds identified above, selection of suitable materials will be readily apparent to those persons skilled in the art.

In addition to calling for the use of a solvent-type component in a flooding liquid, the present invention also requires the use of a thickening agent adapted to increase the viscosity of the flooding liquid. Like the solvent component, the thickening agent or component should also possess a degree of solubility in both mineral oil and water. Solubility in mineral oil, however, in this instance is less important than it is in the case of the solvent component. The thickening agent or component is also employed in much smaller concentrations or proportions than the solvent component, concentrations of the order of about 1.0 percent or less being generally contemplated.

Like the solvent components, the thickener components should possess oleophilic structures which are preferably hydrocarbon-like in nature. They should also possess substituted hydrophilic groups such as hydroxyl, carboxyl, or amino groups, or the like to render them water-soluble. Suitable materials, for example, include water-soluble polyelectrolytes such as the water-soluble polymeric carboxylic acids, the water-soluble salts of these acids, and mixtures of the acids and their salts. Specific examples include polyacrylic acid; polymethacrylic acid; the alkali metal, ammonium and amine salts of these two acids; and mixtures of the acids and their salts. Polymeric alcohols, it should be noted, such as polyvinyl alcohol and poly-allyl alcohols, are not desirable for the purposes of the invention, since their thickening effect is too limited. Cellulose derivatives and natural gums are also undesirable because of their tendency to plug rock structures. Copolymers of maleic anhydride with olefins or with vinyl methyl ether, copolymers of acrylic or methacrylic acid with olefins or with vinyl methyl ether, water-soluble polyesters such as poly(ethylene glycol succinate), polyacrylamides, etc., appear suitable for use.

It is contemplated that the best mode of practicing the invention lies in the injection of a polymeric carboxylic acid such as polyacrylic acid within a petroleum reservoir in conjunction with a water- and oil-soluble aliphatic amine. For example, mixtures of tertiary octyl amine in combination with a polyacrylic acid having a molecular weight range of about 1,000,000 to 10,000,000 appear to be especially effective. These mixtures may be used alone, but they are preferably diluted with water prior to injection within a reservoir. The amount of polyacrylic acid employed should be merely that amount necessary to increase the viscosity of the liquid mixture to the desired level. In general, it is contemplated that thickening additive concentrations of not more than about one percent should be sufficient in virtually all cases.

In those instances where an alcohol rather than an amine is employed as the solvent component of the flooding liquid, and where the alcohol is used in conjunction with a polymerized carboxylic acid (for example, polyacrylic acid), it is preferred that an alkali or other strong base such as an alkali metal hydroxide or ammonia or even an amine be added to the mixture to help maintain the polymerized acid in water-soluble form. It has been found that these acids should be at least partially neutralized in order to assure good water-solubility characteristics.

To further illustrate the nature and value of this invention, attention is directed to the attached FIGURE which shows curves comparing results derived from experiments carried out in core samples of Weiler sandstone. In each experiment, the core sample was first presaturated with water, and a refined mineral oil was then pumped into the core until an equilibrium oil-saturation condition (simulating actual reservoir conditions) was obtained. Thereafter, the core samples were subjected to one of four different types of oil recovery processes, the four curves in the attached drawing being representative of the results obtained thereby. To provide a direct comparison between the four different types of processes, the curves in the drawing are for the case in which the oil within the core possesses a viscosity of about 50 centipoises.

In the drawing, it may be seen that each curve provides a plot of oil recovery versus pore volumes of flooding fluid injected within a core. At this point, it is well to note that Weiler sandstone possesses a porosity of about 21 percent, a permeability to oil of about 50 millidarcies, and an equilibrium oil concentration of about 0.8 pore volume of mineral oil and 0.2 pore volume of water.

Curve A in the drawing shows the oil recoveries that are obtained when subjecting a core of the type described above to a simple waterflooding operation. This curve shows that an ultimate oil recovery of about 40 percent is possible with this process.

Curve B shows the results that are obtained by an operation in which one pore volume of an oil solvent is injected into a Weiler sandstone core and followed by water. This curve indicates a steadily increasing amount of oil recovered, the amount recovered upon injection of one pore volume of the solvent being about 60 percent.

Curve C shows the amount of oil recovered from a core of the above type by flooding the core with a thickened or viscous water solution. The water in this instance was thickened by the addition of polyacrylic acid to a viscosity of about 50 centipoises. The resulting data curve strongly resembles the curve obtained for water alone; and it reveals that an ultimate oil recovery of about 63 percent is obtainable by this procedure.

Curve D provides information on the amount of oil that may be recovered by a process of the present invention. In other words, the curve shows the oil recoveries that are possible by injecting a liquid which is miscible with both water and mineral oil, and which is substantially more viscous than water. In this particular instance, the viscosity of the injected liquid was about 50 centipoises. The liquid was a mixture of 92.2 volume percent t-octyl amine and 6.85 percent water. About 0.95 weight percent polyacrylic acid (one million average molecular weight) was added to the liquid to attain the desired viscosity.

The results obtained by the process of the invention as indicated in curve D show very interesting and unexpected results upon comparison with curves A, B, and C. Thus, for 1.0 pore volumes of oil-displacing fluid injected, curve D shows a greater oil recovery than is possible with any of the other processes. Furthermore, relative to waterflooding alone, it shows a substantially greater increase in oil recovery than would be predicted from curves B and C. Curve B, it will be recalled, shows the oil recoveries possible when injecting one pore volume of an oil solvent followed by water; and curve C shows the oil recoveries when injecting one pore volume of water containing sufficient thickener to bring the water to a viscosity equal to that of the liquid used in obtaining curve D. Curve B shows an oil recovery increase of about 16 percent over that for water alone; and curve C shows an increase of about 19 percent. Thus, if the effects possible by the processes of curves B and C are merely additive, then a process of the type shown in curve D would be expected to provide a recovery boost of about 35 percent relative to waterflooding alone. Instead, curve D shows an increase of about 46 percent, a most unusual and unexpected result.

In addition to recovering more oil from any given portion of a reservoir than is possible with conventional flooding techniques, the process of the present invention also has the advantage of sweeping increased portions of a reservoir. In other words, assuming a 5-spot flooding pattern, a conventional waterflooding operation on a viscous oil generally cannot be expected to have an areal sweep of much more than about 10 to 30 percent. In a 5-spot flooding pattern, an injection well is located at the center of a square; and a producing well is located at each corner of the square. Thus, looking down upon the flooding pattern, a waterflood or solvent-type recovery process will generally never contact more than about 30 percent of the area of the square. By following the principles of the present invention, however, areal (or "sweep") efficiencies much greater than this can be obtained. Thus, areal efficiencies of at least about 50 percent are generally expected; and it is contemplated that efficiencies of at least about 70 percent may be realized.

In carrying out the processes of the invention, it will be recognized that numerous variations and modifications may be practiced without departing from the spirit or scope of the invention. For example, surfactants of various conventional types may be incorporated within the flooding liquids of this invention if so desired. Viscosity stabilizers may be also added to the flooding liquids in those instances where the presence of electrolytes (e.g., such as are present in connate brine waters) would otherwise cause considerable loss of viscosity of the flooding liquid. Stabilizers particularly contemplated for use are resorcinol and thiourea.

It will also be recognized, as mentioned earlier, that the viscous oil- and water-miscible liquids of this invention may be diluted with water to any extent compatible with the practice of the invention. In this instance, then, the liquids become in effect waterfloods in which the water has been increased in viscosity and rendered miscible with petroleum.

The invention claimed is:

1. A method of recovering oil from a subterranean oil-bearing reservoir which is penetrated by an injection well and a spaced production well which comprises the step of injecting a liquid which is at least 50% by volume soluble within both water and the reservoir oil, said liquid having a viscosity of at least about 10 centipoises and sufficient to give the liquid a mobility of not more than about two times that of the reservoir oil, and withdrawing oil from the producing well.

2. A method of recovering viscous petroleum from a petroliferous rock structure which comprises the step of injecting within the structure a liquid which is at least 50% by volume soluble within both water and petroleum, said liquid having a viscosity of at least 10 centipoises and sufficient to provide the liquid with a mobility of not more than about twice that of the petroleum, the volume of liquid being less than the pore volume of the portion of the rock structure traversed thereby but at least 0.1 of said pore volume, injecting water into the rock structure behind said liquid, and recovering petroleum from said structure at a point spaced from the injection point.

3. A method of displacing relatively viscous petroleum from a subterranean reservoir penetrated by an injection well and a production well spaced from said injection well which comprises injecting a liquid which is miscible with both water and petroleum into the reservoir through said injection well, said liquid having a viscosity of at least 10 centipoises and sufficient to provide it with a mobility not more than about two times that of the petroleum, said liquid comprising two components in admixture, one of said components being a solvent component miscible with water and petroleum, the other component being a water-soluble thickening agent for water, and withdrawing fluid including petroleum from the production well.

4. A method as defined in claim 3 in which the thickening agent is a water-soluble polyelectrolyte.

5. A method as defined in claim 3 in which the solvent component is an amine.

6. A method as defined in claim 4 in which the thickening agent is a water-soluble polymeric carboxylic acid.

7. A method of displacing viscous oil from a subterranean reservoir penetrated by an injection well and a production well spaced from said injection well which comprises injecting a liquid which is soluble in both water and said oil into the reservoir through said injection well, said liquid having a viscosity of at least 10 centipoises and sufficient to provide it with a mobility not more than about two times that of said oil, said liquid comprising two components in admixture, one of said components being a solvent component at least fifty percent by volume soluble in both water and said oil, the other component being a water-soluble thickening agent for water, the concentration of said other component in said liquid being less than one percent but sufficient to provide said liquid with said viscosity of at least 10 centipoises, and withdrawing fluid including said oil from the production well.

8. A method as defined in claim 7 in which said thickening agent is both oleophilic and hydrophilic.

References Cited in the file of this patent

UNITED STATES PATENTS

| | | |
|---|---|---|
| Re. 24,873 | Lindauer | Sept. 27, 1960 |
| 2,341,500 | Detling | Feb. 8, 1944 |
| 2,742,089 | Morse et al. | Apr. 17, 1956 |
| 2,771,138 | Beeson | Nov. 20, 1956 |
| 2,827,964 | Sandiford et al. | Mar. 25, 1958 |

OTHER REFERENCES

"Allyl Alcohol," Shell Chemical Corporation, technical publication SC 46–32 (1946), 500 5th Avenue, New York, N.Y. Pages 26–27 relied on.